United States Patent
Checco et al.

(10) Patent No.: US 11,979,460 B2
(45) Date of Patent: *May 7, 2024

(54) DATA SHARDING FOR TRANSMISSION OVER A HIGH GENERATION CELLULAR NETWORK

(71) Applicant: Bank of America Corporation, Charlotte, NC (US)

(72) Inventors: John C. Checco, Stony Point, NY (US); Ryan Muzzo, Saint Charles, FL (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/139,561

(22) Filed: Apr. 26, 2023

(65) Prior Publication Data

US 2023/0262125 A1 Aug. 17, 2023

Related U.S. Application Data

(63) Continuation of application No. 17/553,058, filed on Dec. 16, 2021, now Pat. No. 11,706,299, which is a
(Continued)

(51) Int. Cl.
*H04L 67/1097* (2022.01)
*H04L 9/08* (2006.01)
*H04L 9/40* (2022.01)

(52) U.S. Cl.
CPC ............ *H04L 67/1097* (2013.01); *H04L 9/08* (2013.01); *H04L 63/0428* (2013.01); *H04L 63/061* (2013.01); *H04L 63/08* (2013.01)

(58) Field of Classification Search
CPC ...... H04L 9/08; H04L 67/1097; H04L 63/061; G06F 9/50; G06F 16/22; G06F 16/24542; G06F 9/455
See application file for complete search history.

(56) References Cited

U.S. PATENT DOCUMENTS 8,788,831 B2 7/2014 Snider
9,898,474 B1 2/2018 Sorenson, III
(Continued)

OTHER PUBLICATIONS

A network is only as strong as its weakest shard Yakovenko (CEO, Solana) Mar. 20, 2019 www.helpnetsecurity.com/2019/03/20'/how-sharding-creates-security-loopholes 4 pages.

*Primary Examiner* — Iqbal Zaidi
(74) *Attorney, Agent, or Firm* — Banner & Witcoff, Ltd.

(57) ABSTRACT

Aspects of the disclosure relate to data sharding for transmission over a high generation cellular network. A computing platform may detect, via a communication network, transmission of data from a first computing device to a second computing device. Subsequently, the computing platform may intercept, prior to receipt of the transmission by the second computing device, the data. Then, the computing platform may shard the data into a first shard and a second shard. Then, the computing platform may identify, within the communication network, a first communication channel and a second communication channel. Then, the computing platform may send, to the second computing device, the first shard via the first communication channel, and the second shard via the second communication channel. Subsequently, the computing platform may merge, the first shard and the second shard, to reconfigure the data.

19 Claims, 6 Drawing Sheets

Related U.S. Application Data continuation of application No. 16/778,513, filed on Jan. 31, 2020, now Pat. No. 11,258,854.

(56) References Cited

U.S. PATENT DOCUMENTS

| | | |
|---|---|---|
| 10,248,793 B1 | 4/2019 | Kirschner |
| 10,324,892 B2 | 6/2019 | Burshteyn |
| 10,423,670 B1 | 9/2019 | Sorenson |
| 10,432,721 B2 | 10/2019 | Vermeulen et al. |
| 10,931,450 B1 | 2/2021 | Chellappa et al. |
| 2016/0011990 A1 | 1/2016 | Berengoltz et al. |
| 2019/0014320 A1 | 1/2019 | Navarrete Michelini et al. |
| 2019/0147170 A1 | 5/2019 | Keselman et al. |
| 2019/0227986 A1 | 7/2019 | Burshteyn |
| 2019/0303349 A1 | 10/2019 | Burshteyn |
| 2019/0347210 A1 | 11/2019 | Davis et al. |
| 2021/0044972 A1* | 2/2021 | Murray ................. G06F 21/602 |

\* cited by examiner

DATA SHARDING FOR TRANSMISSION OVER A HIGH GENERATION CELLULAR NETWORK

This application claims the benefit of and is a continuation of U.S. patent application Ser. No. 17/553,058, filed Dec. 16, 2021, and entitled "Data Sharding for Transmission over a High Generation Cellular Network," which claims the benefit of and is a continuation of U.S. patent application Ser. No. 16/778,513, filed Jan. 31, 2020, and entitled "Data Sharding for Transmission over a High Generation Cellular Network," Both of these applications are incorporated by reference herein in their entireties.

BACKGROUND

Aspects of the disclosure relate to deploying digital data processing systems to real-time protection of data. In particular, one or more aspects of the disclosure relate to data sharding for transmission over a high generation cellular network.

Enterprise organizations may utilize various resources to support their computing infrastructure. For large enterprise organizations, maintaining, updating, and managing network activity over the various enterprise resources may be of significant importance in protecting confidential information and/or other sensitive data that is created, transmitted, and/or used for various purposes. It may be helpful to intercept data flow between servers, applications, devices, and so forth, to streamline data transmission, and protect data in transit. As data flows through the network in real-time, such detection and management of data may be time-sensitive and there may be significant advantages for the data protection to be performed in real-time as well. Ensuring that data integrity is maintained, and timely and targeted preventive measures are undertaken, in real-time with speed and accuracy, may be particularly advantageous to ensure a smooth running of an enterprise infrastructure. In many instances, however, it may be difficult to analyze and/or protect data transmission, in an organization's complex network comprising a vast number of network devices and users, while also attempting to optimize network resources, bandwidth utilization, and efficient operations of the computing infrastructure.

SUMMARY

Aspects of the disclosure provide effective, efficient, scalable, fast, reliable, and convenient technical solutions that address and overcome the technical problems associated with data transmission in real-time, by utilizing a high generation cellular network.

In accordance with one or more embodiments, a computing platform having at least one processor, and memory may detect, via a communication network, transmission of data from a first computing device to a second computing device. Subsequently, the computing platform may intercept, prior to receipt of the transmission by the second computing device, the data. Then, the computing platform may shard the data into a first shard and a second shard. Then, the computing platform may identify, within the communication network, a first communication channel and a second communication channel. Then, the computing platform may send, to the second computing device, the first shard via the first communication channel, and the second shard via the second communication channel. Subsequently, the computing platform may merge, the first shard and the second shard, to reconfigure the data.

In some embodiments, the transmission of data may include encrypted data, and the first shard may include the encrypted data, and the second shard may include encryption key management data associated with the encrypted data. In some embodiments, the data may include trading data, and the computing platform may identify, from the trading data, non-confidential data and confidential data. Then, the computing platform may identify, within the communication network, a third communication channel. Then, the computing platform may encrypt the confidential data. In some embodiments, the encrypted data may include the encrypted form of the confidential data. Subsequently, the computing platform may send the non-confidential data via the third communication channel.

In some embodiments, the first communication channel may be over a private enterprise network, and the second communication channel may be over a public network.

In some embodiments, the computing platform may determine that a size of the data exceeds a threshold. Then, the computing platform may shard the data to limit a size of each of the first shard and the second shard to less than the threshold.

In some embodiments, the first communication channel and the second communication channel may be over a fifth-generation cellular network. In some embodiments, the first communication channel may be associated with a first frequency for data transmission, and the second communication channel may be associated with a second frequency for data transmission. In some embodiments, the first communication channel may be over a private enterprise network of the fifth-generation cellular network, and the second communication channel may be over a public network of the fifth-generation cellular network.

In some embodiments, the computing platform may include a transceiver, and the computing platform may, prior to sending the first shard and the second shard, configure the transceiver to convert the first shard and the second shard into a format compatible with data transmission over the cellular network.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
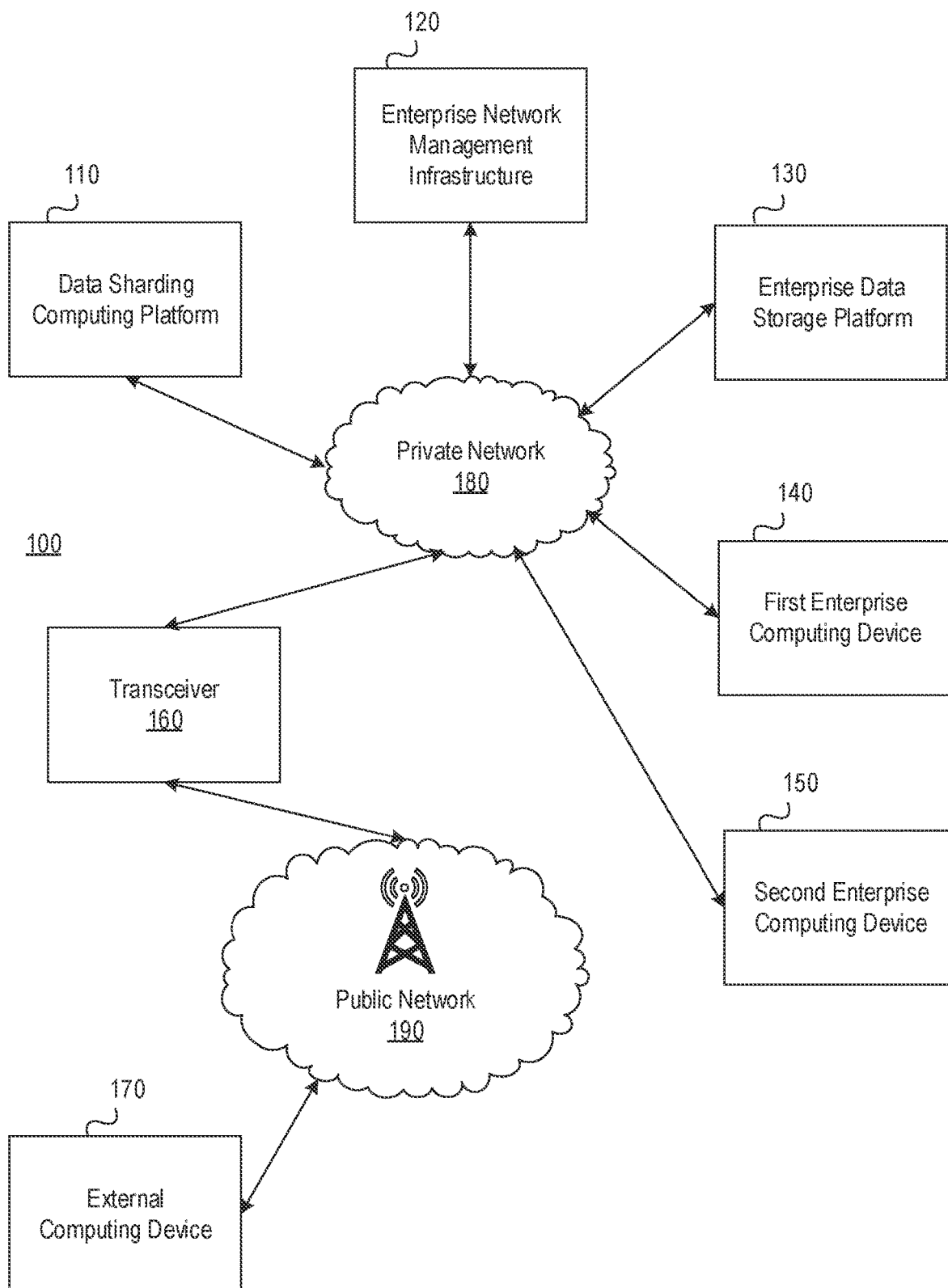
FIGS. 1A and 1B depict an illustrative computing environment for data sharding for transmission over a high generation cellular network in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to data sharding for transmission over a high generation cellular network. For example, an enterprise network management infrastructure may deploy computing resources such as network devices, web resources, electronic mail applications, external vendor applications, mobile applications, and so forth. A large amount of data (including machine-generated data) may be exchanged between such applications, both within an enterprise organization, and between external entities and entities within the enterprise organization. In some instances, such data transmissions, unless adequately protected, may pose a large security threat to the enterprise services. For large enterprise organizations with vast amounts of deployed resources and a large number of employees, data transmissions may take varied and complex forms, and it may be advantageous to provide real-time protection, including protecting in transit.

Cellular networks are generally associated with service areas that are subdivided into cells. Location data for a device is based on the cell within which the device is located. Accordingly, smaller cells provide greater accuracy and reliability of location data. High generation cellular networks, such as a fifth generation ("5G") cellular network, may be configured to considerably reduce the cell size, thereby improving accuracy of location data. Also, for example, in high generation cellular networks, each cell may be equipped with multiple antennas configured to communicate with a computing device within the cell so that multiple streams of data may be simultaneously transmitted, thereby increasing data transmission rates, reducing backlog due to network traffic, and enhancing speed and accuracy of communications. Multiple streams, often with prescribed frequency bandwidths, may also enable more efficient transmission of data.

Also, the ability to establish and maintain a reliable communication channel between computing devices sharing data may be useful in maintaining integrity of data transmissions. When time-sensitive data has to be identified, processed and shared in real-time, high-speed data transmission rates, increased bandwidth, and low latency may be of great significance to transmit data with speed and accuracy, while maintaining the integrity and confidentiality of the underlying data.

Generally, it may not be possible to manually manage such a vast array of network applications and devices, with near-continuous flow of data. Accordingly, it may be of great significance for a large enterprise organization (e.g., financial institution), with large amounts of confidential information to protect, to detect and protect, in real-time, data transmissions.

Accordingly, aspects of this disclosure relate to automated monitoring of data transmissions between a source computing device and a destination computing device and protect such data transmissions in real-time. Intercepting, and/or protecting such data transmissions via a manual process and/or based on mental steps is unlikely because it relates to vast amounts of real-time data traffic, and such data traffic is rapidly changing in real-time over thousands of enterprise resources. Also, since the data may reside and/or be exchanged over a vast array of users, internal and external applications, and network devices, it necessitates a use of computing devices to intercept the plurality of data transmissions over networks, shard the data when appropriate, identify appropriate wireless network channels to send the sharded data, and merge the shards to reconfigure the data, in real-time and over the network.

In many enterprise related applications, networks may experience bottlenecks and other data traffic congestion issues. Limits on storage capacities, memory capacities, available processing capacities for CPUs, and network bandwidth related issues, may contribute to such traffic congestion. Accordingly, data sharding may be an effective way to alleviate some of the technical challenges encountered in data transmissions. Also, for example, financial institutions handle large volumes of confidential data. Such data may need to be encrypted. However, encrypted data may be intercepted in transmission, and may be exposed to a risk of being decrypted. In some instances, such a risk may be minimized by separating the encrypted data traffic and the key management traffic, as described herein. It may be noted, that as data transmissions occur over a computing network, the problem of protecting data transmissions arises in the realm of networks, and as described herein, a solution is necessarily rooted in computer technology to overcome a problem arising in the realm of computer networks.

Figure 1B:
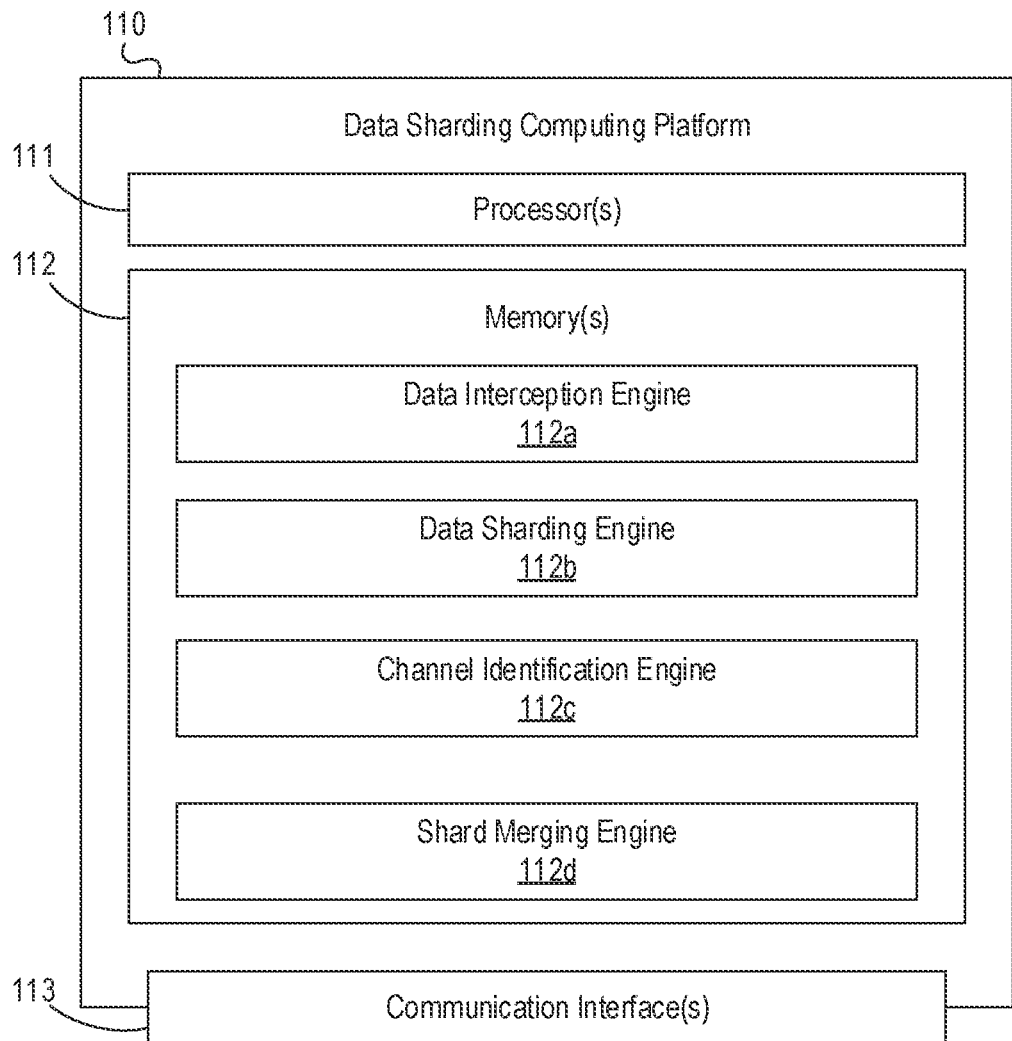

FIGS. 1A and 1B depict an illustrative computing environment for data sharding for transmission over a high generation cellular network in accordance with one or more example embodiments. Referring to FIG. 1A, computing environment 100 may include one or more computer systems. For example, computing environment 100 may include data sharding computing platform 110, enterprise network management infrastructure 120, enterprise data storage platform 130, first computing device 140, second computing device 150, transceiver 160, and external computing device 170.

As illustrated in greater detail below, data sharding computing platform 110 may include one or more computing devices configured to perform one or more of the functions described herein. For example, data sharding computing platform 110 may include one or more computers (e.g., laptop computers, desktop computers, servers, server blades, or the like) and/or other computer components (e.g., processors, memories, communication networks).

Enterprise network management infrastructure 120 may include one or more computing devices and/or other computer components (e.g., processors, memories, communication interfaces). In addition, enterprise network management infrastructure 120 may be configured to manage, host, execute, and/or otherwise provide one or more enterprise applications and/or devices (e.g., first enterprise computing device 140, second enterprise computing device 150). For example, enterprise network management infrastructure 120 may be configured to manage, host, execute, and/or otherwise provide a computing platform for various network devices and enterprise applications. In some instances, enterprise network management infrastructure 120 may be configured to provide various enterprise and/or back-office computing functions for an enterprise organization, such as a financial institution. For example, enterprise network management infrastructure 120 may include various servers and/or databases that store and/or otherwise maintain account information, such as financial account information including account balances, transaction history, account owner information, and/or other information. Also, for example, enterprise network management infrastructure 120 may include various servers and/or databases that may manage information technology resources for the enterprise organization. Additionally, or alternatively, enterprise network management infrastructure 120 may receive instructions from data sharding computing platform 110 and execute the instructions in a timely manner.

Enterprise data storage platform 130 may include one or more computing devices and/or other computer components (e.g., processors, memories, communication interfaces). In addition, and as illustrated in greater detail below, enterprise data storage platform 130 may be configured to store and/or otherwise maintain enterprise data, including data exchanged between network devices and/or other resources hosted, executed, and/or otherwise provided by enterprise network management infrastructure 120. Also, for example, enterprise data storage platform 130 may be configured to store and/or otherwise maintain information associated with data transmissions between enterprise applications and/or devices (e.g., first enterprise computing device 140, second enterprise computing device 150), and/or between an enterprise application and/or device and an external vendor application, user computing device (e.g., first enterprise computing device 140 and external computing device 170). Additionally, or alternatively, enterprise network management infrastructure 120 may load data from enterprise data storage platform 130, manipulate and/or otherwise process such data, and return modified data and/or other data to enterprise data storage platform 130 and/or to other computer systems included in computing environment 100.

First enterprise computing device 140 and second enterprise computing device 150 may be devices, servers, and so forth configured to host applications utilized by the enterprise organization, and managed, hosted, executed, and/or otherwise provided by enterprise network management infrastructure 120. For example, first enterprise computing device 140 may host a financial application and second enterprise computing device 150 may host an accounting application. Also, for example, first enterprise computing device 140 may host a travel reservation related application and second enterprise computing device 150 may host an expense management application. Also, for example, first enterprise computing device 140 may host a word processing application and second enterprise computing device 150 may host a telecommunications application. In some embodiments, first enterprise computing device 140 and second enterprise computing device 150 may be user devices that exchange data, and/or user devices that access enterprise applications. The term "enterprise application" as used herein, may generally refer to any application used within an enterprise organization. For example, an enterprise application may be a stand-alone application, or a suite of applications.

External computing device 170 may be a device, server, and so forth configured to host an application provided by a vendor, and/or a user outside the enterprise organization. For example, external computing device 170 may host a human resource application, a travel management application, a health insurance provider application, payment processing application, a voice over IP ("VOIP") service application, and so forth. The term "external application" as used herein, may generally refer to any application provided by an external vendor to an enterprise organization. In some embodiments, external computing device 170 may be a user device that may communicate with first enterprise computing device 140 and/or second enterprise computing device 150. For example, external computing device 170 may be a user device that communicates with a web portal for a financial institution.

Transceiver 160 may be a device, server, and so forth configured to format data for receipt and transmission over a cellular network. For example, transceiver 160 may be an antenna that communicates data between an enterprise organization's private network and a cellular network's transmission antenna. Also, for example, transceiver 160 may be an antenna that communicates data between a mobile computing device and a cellular network's transmission tower.

Computing environment 100 also may include one or more networks, which may interconnect one or more of data sharding computing platform 110, enterprise network management infrastructure 120, enterprise data storage platform 130, first enterprise computing device 140, second enterprise computing device 150, transceiver 160, and external computing device 170. For example, computing environment 100 may include private network 180 (which may interconnect, for example, data sharding computing platform 110, enterprise network management infrastructure 120, enterprise data storage platform 130, first enterprise computing device 140, second enterprise computing device 150, transceiver 160, and/or one or more other systems (which may be associated with an organization, such as a financial institution), and public network 190 (which may interconnect, for example, external computing device 170 with private network 180 and/or one or more other systems, public networks, sub-networks, and/or the like). For example, public network 190 may interconnect external computing device 170 with first enterprise computing device 140 and/or second enterprise computing device 150 via private network 180. In some instances, public network 190 may be a high generation cellular network, such as, for example, a fifth generation ("5G") or higher cellular network. In some instances, private network 180 may likewise be a high generation cellular enterprise network, such as, for example, a 5G or higher cellular network. In some embodiments, private network 180 may be a 5G network privately owned and/or licensed by an enterprise organization.

In one or more arrangements, data sharding computing platform 110, enterprise network management infrastructure 120, enterprise data storage platform 130, first enterprise computing device 140, second enterprise computing device 150, transceiver 160, and external computing device 170, and/or the other systems included in computing environment 100 may be any type of computing device capable of communicating with a user interface, receiving input via the user interface, and communicating with one or more other computing devices. For example, data sharding computing platform 110, enterprise network management infrastructure 120, enterprise data storage platform 130, first enterprise computing device 140, second enterprise computing device 150, transceiver 160, and external computing device 170, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of data sharding computing platform 110, enterprise network management infrastructure 120, enterprise data storage platform 130, first enterprise computing device 140, second enterprise computing device 150, transceiver 160, and external computing device 170, may, in some instances, be special-purpose computing devices configured to perform specific functions.

Referring to FIG. 1B, data sharding computing platform 110 may include one or more processors 111, memory 112, and communication interface 113. A data bus may interconnect processor 111, memory 112, and communication interface 113. Communication interface 113 may be a network interface configured to support communication between data sharding computing platform 110 and one or more networks (e.g., public network, private network, a local network, or the like). Memory 112 may include one or more program modules having instructions that when executed by processor 111 cause data sharding computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of data sharding computing platform 110 and/or by different computing devices that may form and/or otherwise make up data sharding computing platform 110. For example, memory 112 may have, store, and/or include data interception engine 112a, data sharding engine 112b, channel identification engine 112c, and shard merging engine 112d. Data interception engine 112a may have instructions that direct and/or cause data sharding computing platform 110 to intercept, prior to receipt of the transmission by the second computing device, the data, as discussed in greater detail below. Data sharding engine 112b may have instructions that direct and/or cause data sharding computing platform 110 to shard the data into a first shard and a second shard. In some embodiments, data sharding engine 112b may have instructions that direct and/or cause data sharding computing platform 110 to determine that a size of the data exceeds a threshold, and shard the data to limit a size of each of the first shard and the second shard to less than the threshold. Channel identification engine 112c may have instructions that direct and/or cause data sharding computing platform 110 to identify, within the communication network, a first communication channel and a second communication channel. In some embodiments, channel identification engine 112c may have instructions that direct and/or cause data sharding computing platform 110 to send, to the second computing device, the first shard via the first communication channel, and the second shard via the second communication channel. Shard merging engine 112d may have instructions that direct and/or cause data sharding computing platform 110 to merge, the first shard and the second shard, to reconfigure the data.

Figure 2:
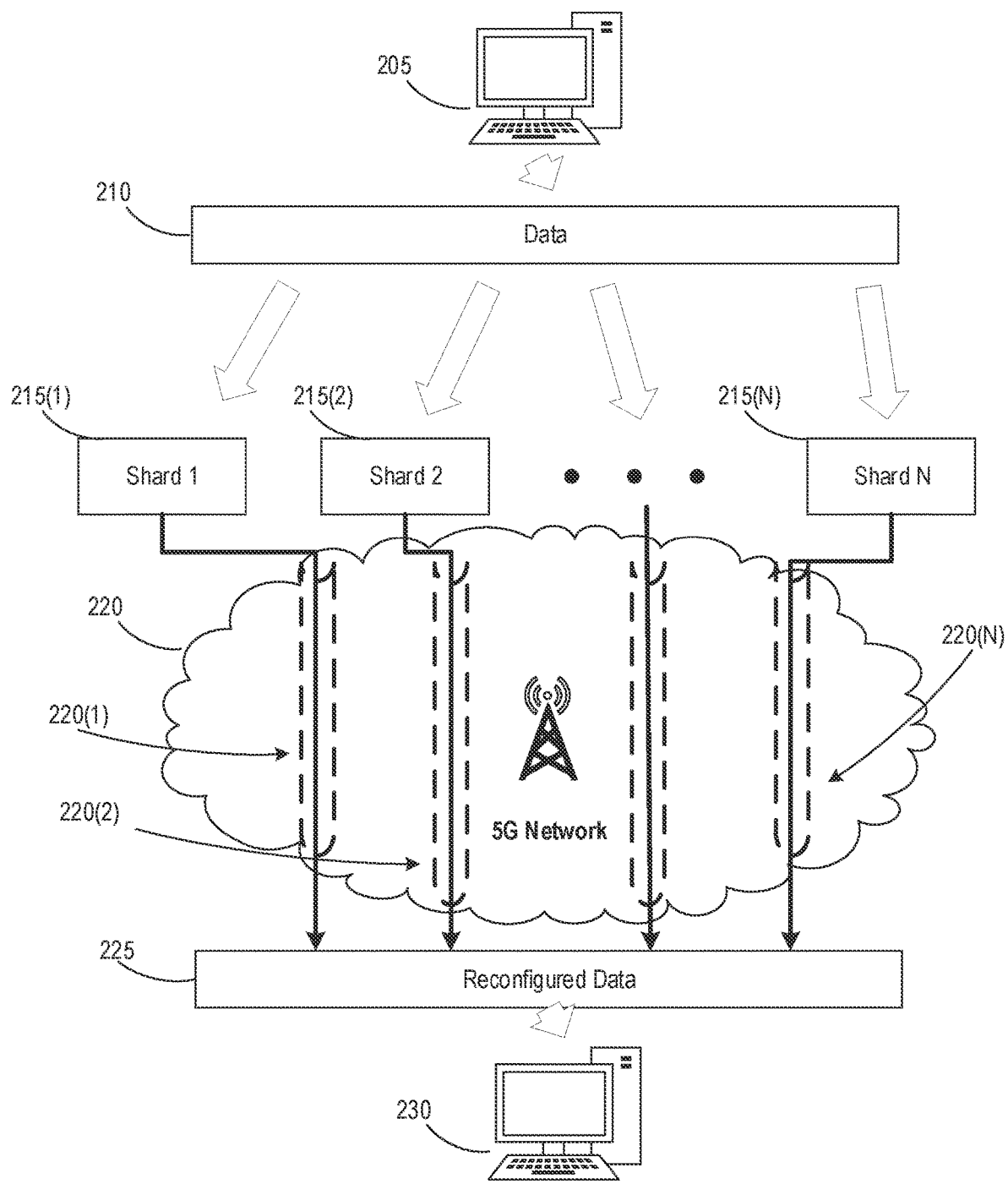
FIG. 2 depicts an illustrative network environment for data sharding for transmission over a high generation cellular network in accordance with one or more example embodiments.

FIG. 2 depicts an illustrative network environment for data sharding for transmission over a high generation cellular network in accordance with one or more example embodiments. Referring to FIG. 2, data sharding computing platform 110 may detect, via a communication network, transmission of data 210 from a first computing device 205 to a second computing device 230. As described herein, enterprise network management infrastructure 120 may be configured to manage, host, execute, and/or otherwise provide one or more enterprise applications. Network devices (e.g., first computing device 205, second computing device 230) within enterprise network management infrastructure 120 may generate large volumes of data transmissions, including machine-generated transmissions. For example, network devices, such as, various servers and/or databases, sensors, routers, computing devices, printers, scanners, cameras, and so forth, may generate vast amounts of data. Additional devices may include, for example, web resources, firewalls, and/or operating systems. Such data may include, for example, access data, log data, location data, data on software updates, diagnostic data, user and/or account data, trading data, and so forth.

Generally, enterprise applications and/or vendor applications may communicate with one another to exchange information via data transmissions. For example, each data transmission may originate at a first computing device (e.g., first computing device 205) and a second computing device (e.g., second computing device 230) may be an intended recipient. For example, a source application hosted by the first computing device (e.g., first computing device 205) may initiate a data transmission to request information, and the destination application hosted by the second computing device (e.g., second computing device 230) may receive this request. In response, the destination application may provide the requested information by initiating a data transmission to the requesting (e.g., source) application. Data transmissions may include exchange of data packets over a network. Content of the data transmission may include electronic communication messages, HTML documents, word processing documents, media content, audio and/or visual content, data packets associated with telecommunications, secured communications, and so forth.

In some embodiments, the source application and the destination application may be associated with an enterprise organization. For example, the source application may be, for example, hosted by the first computing device (e.g., first computing device 205), and the destination application may be, for example, hosted by the second computing device (e.g., second computing device 230). In some embodiments, the source application may be associated with an enterprise organization, and the destination application may be associated with an external vendor organization. For example, the source application may be, for example, hosted by the first computing device (e.g., first computing device 205), and the destination application may be, for example, hosted by an external computing device (e.g., second computing device 230). In some embodiments, the destination application may be associated with an enterprise organization, and the source application may be associated with an external vendor organization. For example, the source application may be, for example, hosted by an external computing device (e.g., first computing device 205), and the destination application may be, for example, hosted by the second computing device (e.g., second computing device 230).

In some embodiments, data sharding computing platform 110 may act as a data clearinghouse. For example, data sharding computing platform 110 may intercept data 210. In some embodiments, data 210 may be intercepted in transit. For example, data sharding computing platform 110 may intercept, prior to receipt of the transmission by the second computing device 230, data 210. Also, for example, data packets sent over a network may include headers that list source and/or destination network nodes for a data packet, a communication path for the data packet, and so forth. In some embodiments, data sharding computing platform 110 may read the headers for data packets and intercept data that have headers indicating data management protocols. For example, a header may indicate that data 210 is highly confidential, and data sharding computing platform 110 may intercept the data to apply protective measures, as described herein. As another example, a header may indicate that data 210 is being transmitted by an enterprise employee with a high level of security clearance, and data sharding computing platform 110 may intercept the data to apply appropriate protective measures.

In some embodiments, data sharding computing platform 110 may retrieve the data 210 from the first computing device 205, including a variety of sources, such as, for example, via an application programming interface ("API"). In some embodiments, data sharding computing platform 110 may monitor an enterprise device (e.g., first computing device 205) via a device access manager, and/or device driver. Also, for example, data 210 may be retrieved from log files (server log files, database log files, application activity files), network management devices, network routers, and so forth.

In some embodiments, data sharding computing platform 110 may determine that a size of data 210 exceeds a threshold. For example, the size of data 210 may exceed a maximum capacity for a communication channel in network 220. Also, for example, data sharding computing platform 110 may receive network traffic information from a network management device, and determine that the size of data 210 may exceed a dynamic network capacity for network 220. In some embodiments, data sharding computing platform 110 may perform load balancing activities to process the data 210.

In some embodiments, data sharding computing platform 110 may shard the data into a first shard and a second shard. For example, data sharding computing platform 110 may shard data 210 into a plurality of shards (e.g., shard 1 215(1), shard 2 215(2), ..., shard N 215(N)). In some embodiments, data sharding computing platform 110 may shard data 210 into a plurality of shards (e.g., shard 1 215(1), shard 2 215(2), ..., shard N 215(N)) so as to limit a size of each of the shards to less than the threshold capacity for one or more communications channels of network 220.

The term "sharding" as utilized herein, may generally refer to a process of breaking a large data into smaller data. For example, in a tabular representation of a large dataset, the dataset may be partitioned horizontally. For example, a table with 1000 rows may be sharded into 10 shards, each comprising 100 rows. For example, the shards may comprise rows 1-100, rows 101-200, rows 201-300, ..., and rows 901-1000. Generally speaking, shards need not be of the same size. For example, a table with 1000 rows may be sharded into three shards, a first shard comprising rows 1-400, a second shar comprising rows 401-550, and a third shard comprising rows 551-1000. Similar techniques may be applied to shard a database vertically.

In some embodiments, hash-based sharding may be performed. For example, data sharding computing platform 110 may generate a hash value from a shard key's value. The hash value may be utilized to allocate data to the various shards. The hash value may then be utilized later to recombine the shards to reconfigure the dataset. In some embodiments, range-based sharding may be performed. For example, data sharding computing platform 110 may partition a range of data values and allocate data to a shard based on an allocated range of data values. Additional, and/or alternative sharding techniques may be utilized to shard the data.

Generally, with higher generation cellular networks (e.g., 5G and higher), multiple channels may be available to transmit data simultaneously over the network. For example, each cell in a service area may be equipped with multiple antennas configured to communicate with devices within the cell so that multiple streams of data may be simultaneously transmitted, thereby increasing data transmission rates, reducing backlog due to network traffic, and enhancing speed and accuracy of communications. In some embodiments, MIMO (Multiple-Input Multiple-Output) technology may be utilized. For example, MIMO is standardized for various communication standards such as IEEE 802.11n ("Wi-Fi"), 802.11ac ("Wi-Fi"), WiMAX ("4G"), and Long Term Evolution ("LTE"). Also, for example, 5G NR ("New Radio") Massive MIMO technology may enable multi-channel data transmission by deploying a large number of antennas, and utilizing complex algorithms that are designed to efficiently coordinate operations of such antennas. For example, spatial diversity of Massive MIMO may enable data transmissions along multiple spatial paths.

In some embodiments, data sharding computing platform 110 may identify, within the communication network, a first communication channel and a second communication channel. For example, data sharding computing platform 110 may identify, within network 220, a first communication channel 220(1), a second communication channel 220(2), ..., an N-th communication channel 220(N), In some embodiments, the communication channels may be identified based on a type and/or size of data shards (e.g., shard 1 215(1), shard 2 215(2), ..., shard N 215(N)). Also, for example, the communication channels may be identified based on their respective availability.

In some embodiments, the communication channels may be over a fifth-generation cellular network. For example, data sharding computing platform 110 may identify the communication channels over the fifth-generation cellular network. A high generation cellular network, such as a fifth-generation cellular network, may be designed for high bandwidth, low latency, high data transmission rates, and/or location accuracies. As described herein, multipath propagation capabilities of radio signals, such as MIMO capabilities of higher generation wireless networks, may enable simultaneous communication channels that reduce delays due to high volume network traffic.

In some embodiments, the first communication channel may be associated with a first frequency for data transmission, and the second communication channel may be associated with a second frequency for data transmission. For example, millimeter wave bands, such as 26 GHz, 28 GHz, 38 GHz, and 60 GHz, may provide data transmissions rates up to 20 gigabits per second. In some embodiments, Massive MIMO, with typically 64 to 256 antennas, may amplify such data transmissions rates. Standards for frequency bands for 5G NR and associated channel bandwidths may be generally available. Frequency bands may also vary by geography (e.g., different countries may implement different frequencies). For example, a frequency band in Europe may range from 3400 to 3800 MHz, whereas, USA may provide frequency bands in the range 3100-3550 MHz and 3700-4200 MHz. Also, for example, very high frequency bands may be available (e.g., Europe: 24.25-27.5 GHz, USA 27.5-28.35 GHz, and so forth). Accordingly, data sharding computing platform 110 may identify communication channels (e.g., a first communication channel 220(1), a second communication channel 220(2), ..., an N-th communication channel 220(N)), based on the shards (e.g., shard 1 215(1), shard 2 215(2), ..., shard N 215(N)). In some embodiments, available communication channels may determine how data sharding computing platform 110 may shard data 210 based on compatibility.

In some embodiments, data sharding computing platform 110 may send, to the second computing device, the first shard via the first communication channel, and the second shard via the second communication channel. For example, data sharding computing platform 110 may send, to the second computing device 230, shard 1 215(1) via first communication channel 220(1), shard 2 215(2) via second communication channel 220(2), and shard N 215(N) via N-th communication channel 220(N).

In some embodiments, data sharding computing platform 110 may merge, the first shard and the second shard, to reconfigure the data. For example, data sharding computing platform 110 may merge shard 1 215(1) from first communication channel 220(1), shard 2 215(2) from second communication channel 220(2), and shard N 215(N) from N-th communication channel 220(N), to generate reconfigured data 225. Generally, reconfigured data 225 may be substantially similar to data 210, subject to potential variations in network transmissions.

In some embodiments, adjacent shards may be merged together. Generally, two shards may be considered to be adjacent if a union of their respective sets of hash key ranges is a hash key range with no gaps. For example, a first shard with a first hash key range 232 . . . 254 and a second shard with a second hash key range 255 . . . 282 may be considered as adjacent shards since a union of the first hash key range 232 . . . 254 and the second hash key range 255 . . . 282 is a contiguous hash key range 232 . . . 282 without any gaps. On the other hand, a first shard with a first hash key range 232 . . . 254 and a second shard with a second hash key range 269 . . . 282 may not be considered as adjacent shards since a union of the first hash key range 232 . . . 254 and the second hash key range 269 . . . 282 is not a contiguous hash key range, since it has a gap comprising a hash key range 255 . . . 268.

Figure 3:
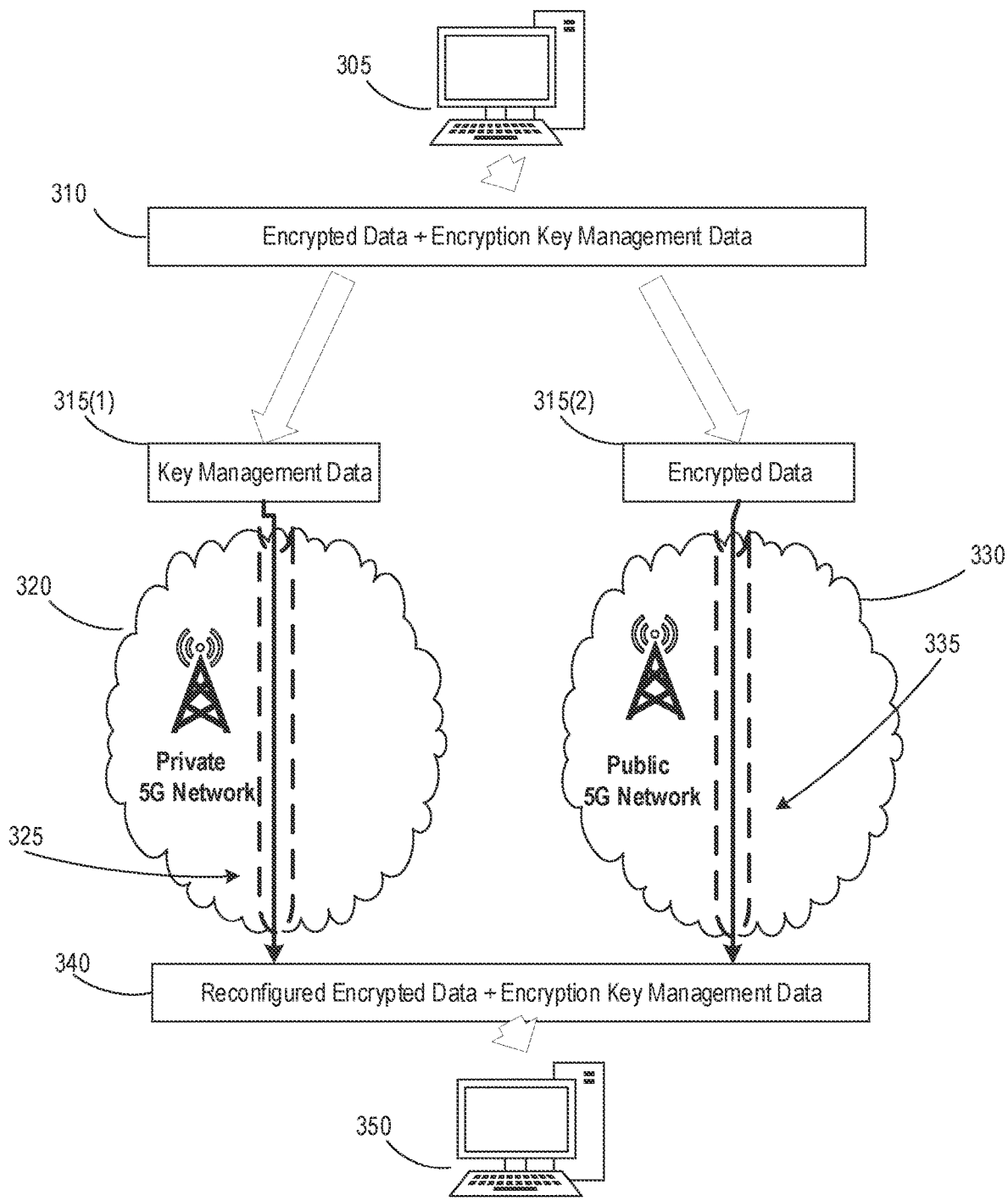
FIG. 3 depicts another illustrative network environment for data sharding for transmission over a high generation cellular network in accordance with one or more example embodiments.

FIG. 3 depicts another illustrative network environment for data sharding for transmission over a high generation cellular network in accordance with one or more example embodiments. Referring to FIG. 3, data sharding computing platform 110 may detect, via a communication network, transmission of encrypted data 310 from a first computing device 305 to a second computing device 350. For example, a first user may generate a message at first computing device 305, for transmission to second computing device 350. The message may be transmitted as encrypted data 310. As another example, a first user may generate a request to trade shares via a trading platform operated by a financial institution. The request may be sent from first computing device 305 to an enterprise device 350 (e.g., a trading platform, or an enterprise device operated by an enterprise user). In such instances, a text of the message or request may be converted to coded text or ciphertext.

Generally, trade related data may include confidential data. In some embodiments, trade related data may include publicly available information such as live data from stock exchanges, sent via multi-cast. In some embodiments, data sharding computing platform 110 may separate the confidential data from the non-confidential data, and may apply encryption techniques to encrypt the confidential data.

One or more encryption techniques may be utilized to encrypt data, such as, for example, Advanced Encryption Standard ("AES"), Rivest-Shamir-Adleman ("RSA"), Triple Data Encryption Standard ("3DES"), Twofish, and so forth. Generally, an encryption process utilizes an algorithm to generate a pseudo-random encryption key. Although encrypted data may be decrypted in an absence of the encryption key, computational resources may pose a considerable challenge to such a decryption process.

Generally, encrypted data and the encryption key may be transmitted together. However, transmitting the encrypted data separate from the encryption key may reduce a risk of intercepted data being decrypted. Accordingly, data sharding computing platform 110 may shard encrypted data 310 into key management data 315(1) and encrypted data 315(2). In some embodiments, data sharding computing platform 110 may identify a first communication channel 325 in a first network 320, and a second communication channel 335 in a second network 330. In some embodiments, first network 320 may be the same as second network 330. However, in some implementations, first network 320 may be a private network of an enterprise organization. For example, first network 320 may be a private 5G network operated by a financial institution. Likewise, in some implementations, second network 330 may be a public 5G network.

In some embodiments, data sharding computing platform 110 may send key management data 315(1) via first communication channel 325, and send encrypted data 315(2) via second communication channel 335. For example, data sharding computing platform 110 may send the encryption key via a private 5G channel, and send the encrypted data via the public 5G channel. In addition to separating transmission of the encryption key from the encrypted data, which may reduce a risk of interception in transit leading to a potential decryption and unauthorized access of the encrypted data, sending the encryption key via a private network (e.g., private 5G network), further reduces a risk of unauthorized access to the encryption key.

In some embodiments, when confidential data is encrypted, data sharding computing platform 110 may send key management data 315(1) via first communication channel 325, and send encrypted data 315(2) via second communication channel 335. Additionally, a non-confidential portion of the data may be transmitted via a third communication channel (not shown in FIG. 3).

Also, as described herein, data sharding computing platform 110 may merge, key management data 315(1) and the encrypted data 315(2), to reconfigure the data and generate reconfigured data 340. Generally, reconfigured data 340 may be substantially similar to encrypted data 310. Such reconfigured data 310 may then be provided to second computing device 350.

Figure 4:
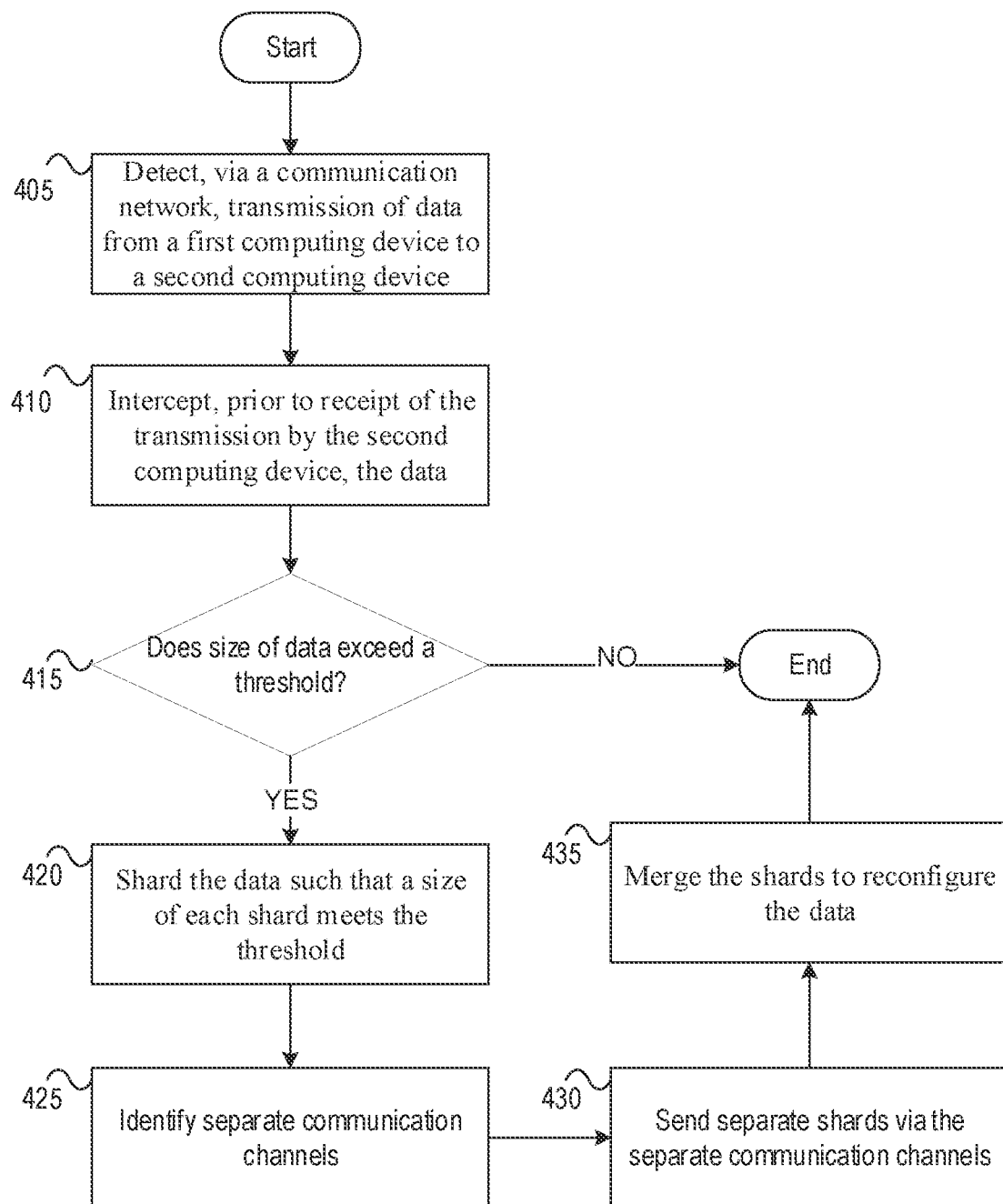
FIG. 4 depicts an illustrative method for data sharding for transmission over a high generation cellular network in accordance with one or more example embodiments.

FIG. 4 depicts an illustrative method for data sharding for transmission over a high generation cellular network in accordance with one or more example embodiments. Referring to FIG. 4, at step 405, a computing platform having at least one processor, and memory may detect, via a communication network, transmission of data from a first computing device to a second computing device. At step 410, the computing platform may intercept, prior to receipt of the transmission by the second computing device, the data. At step 415, the computing platform may determine if a size of the data exceeds a threshold. Upon a determination that the size of the data exceeds a threshold, the process moves to step 420. At step 420, the computing platform may shard the data such that a size of each shard meets the threshold. At step 425, the computing platform may identify, within the communication network, a separate communication channel for each shard. At step 430, the computing platform may send separate shards via the separate communication channels. At step 435, the computing platform may merge the shards to reconfigure the data.

Figure 5:
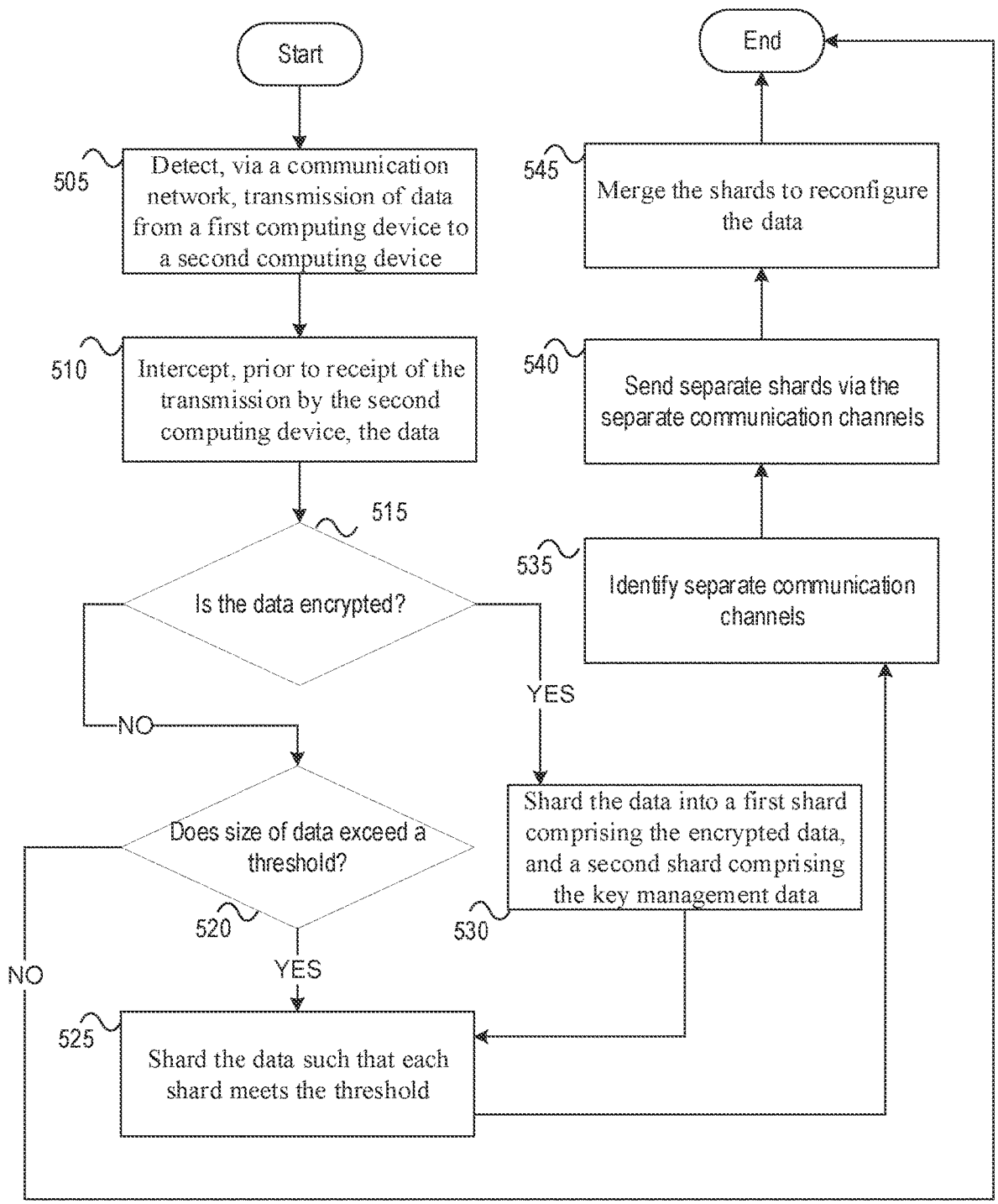
FIG. 5 depicts another illustrative method for data sharding for transmission over a high generation cellular network in accordance with one or more example embodiments.

FIG. 5 depicts another illustrative method for data sharding for transmission over a high generation cellular network in accordance with one or more example embodiments. Referring to FIG. 5, at step 505, a computing platform having at least one processor, and memory may detect, via a communication network, transmission of data from a first computing device to a second computing device. At step 510, the computing platform may intercept, prior to receipt of the transmission by the second computing device, the data. At step 515, the computing platform may determine if the data is in encrypted form. Upon a determination that the data is in encrypted form, the process moves to step 530. At step 530, the computing platform may shard the data into a first shard comprising the encrypted data, and a second shard comprising the encryption key management data. Subsequently, the process moves to step 525.

Upon a determination that the data is not in encrypted form, the process moves to step 520. At step 520, the computing platform may determine if a size of the data exceeds a threshold. Upon a determination that the size of the data exceeds a threshold, the process moves to step 525. At step 525, the computing platform may shard the data such that a size of each shard meets the threshold. At step 535, the computing platform may identify, within the communication network, a separate communication channel for each shard. At step 540, the computing platform may send separate shards via the separate communication channels. At step 545, the computing platform may merge the shards to reconfigure the data.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular time-sensitive tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor; and
   a non-transitory computer-readable medium storing computer-readable instructions that, when executed by the at least one processor, cause the computing platform to:
      detect, via a communication network, transmission of data from a first computing device to a second computing device;
      intercept, prior to receipt of the transmission by the second computing device, the data;
      shard the data into a first shard and a second shard, wherein the sharding comprises:
         determining that a size of the data exceeds a threshold; and
         sharding the data to limit a size of each of the first shard and the second shard to less than the threshold;
      identify, within the communication network, a first communication channel and a second communication channel, wherein the first communication channel is associated with a first frequency for data transmission, and the second communication channel is associated with a second frequency for data transmission;
      send, to the second computing device:
         the first shard via the first communication channel, and
         the second shard via the second communication channel; and
      merge, the first shard and the second shard, to reconfigure the data,
      wherein the transmission of data comprises encrypted data, and wherein the first shard comprises the encrypted data, and wherein the second shard comprises encryption key management data associated with the encrypted data.

2. The computing platform of claim 1, wherein the data comprises trading data, and wherein the instructions to shard the data comprise additional computer-readable instructions that, when executed by the at least one processor, cause the computing platform to:
identify, from the trading data, non-confidential data and confidential data;
identify, within the communication network, a third communication channel;
encrypt the confidential data; and
wherein the encrypted data comprises an encrypted form of the confidential data,
and wherein the instructions to send the data comprise additional computer-readable instructions that, when executed by the at least one processor, cause the computing platform to:
send the non-confidential data via the third communication channel.

3. The computing platform of claim 1, wherein the first communication channel is over a private enterprise network, and the second communication channel is over a public network.

4. The computing platform of claim 1, wherein the first communication channel and the second communication channel are over a wireless network.

5. The computing platform of claim 4, wherein the first communication channel is over a private enterprise network of the wireless network, and the second communication channel is over a public network of the wireless network.

6. The computing platform of claim 4, further comprising a transceiver, and wherein the instructions to send, to the second computing device, the first shard and the second shard, comprise additional computer-readable instructions that, when executed by the at least one processor, cause the computing platform to:
prior to sending the first shard and the second shard, configure the transceiver to convert the first shard and the second shard into a format compatible with data transmission over the wireless network.

7. The computing platform of claim 1, wherein the instructions to shard the data comprise additional computer-readable instructions that, when executed by the at least one processor, cause the computing platform to:
read a header of a data packet; and
intercept the data in the data packet only when the header is indicative a data management protocol.

8. A method, comprising:
at a computing platform comprising at least one processor, and memory:
detecting, via a communication network, transmission of encrypted data from a first computing device to a second computing device;
intercepting, prior to receipt of the transmission by the second computing device, the encrypted data;
sharding the encrypted data into a first shard comprising encryption traffic, and a second shard comprising encryption key management traffic, wherein the sharding comprises:
determining that a size of the data exceeds a threshold; and
sharding the data to limit a size of each of the first shard and the second shard to less than the threshold;
identifying, within the communication network, a first communication channel and a second communication channel;
sending, to the second computing device:
the first shard via the first communication channel, and
the second shard via the second communication channel;
identifying, within the communication network, a third communication channel;
encrypting confidential data, wherein the encryption traffic comprises an encrypted form of the confidential data;
sending non-confidential data via the third communication channel; and
merging, the first shard and the second shard, to generate the encrypted data.

9. The method of claim 8, wherein the first communication channel and the second communication channel are over a wireless network.

10. The method of claim 8, wherein the first communication channel is associated with a first frequency for data transmission, and the second communication channel is associated with a second frequency for data transmission.

11. The method of claim 8, wherein the first communication channel is over a private network of a wireless network, and the second communication channel is over a public network of the wireless network.

12. The method of claim 8, further comprising:
prior to sending the first shard and the second shard, configuring a transceiver to convert the first shard and the second shard into a format compatible with data transmission over a cellular network.

13. The method of claim 8, further comprising:
reading a header of a data packet; and
intercepting the data in the data packet only when the header is indicative a data management protocol.

14. One or more non-transitory computer-readable media storing instructions that, when executed by a computing platform comprising at least one processor, a transceiver, and memory, cause the computing platform to:
detect, via a communication network, transmission of data from a first computing device to a second computing device, wherein the communication network is a cellular network;
intercept, prior to receipt of the transmission by the second computing device, the data;
shard the data into a first shard and a second shard, wherein the sharding comprises:
determining that a size of the data exceeds a threshold; and
sharding the data to limit a size of each of the first shard and the second shard to less than the threshold;
identify, within the communication network, a first communication channel and a second communication channel, wherein the first communication channel and the second communication channel are over a wireless network;
send, to the second computing device:
the first shard via the first communication channel, and
the second shard via the second communication channel;
prior to sending the first shard and the second shard, configure the transceiver to convert the first shard and the second shard into a format compatible with data transmission over the wireless network; and
merge, the first shard and the second shard, to reconfigure the data.

15. The one or more non-transitory computer-readable media of claim 14, wherein the transmission of data comprises encrypted data, and wherein the first shard comprises the encrypted data, and wherein the second shard comprises encryption key management data associated with the encrypted data.

16. The one or more non-transitory computer-readable media of claim 14, wherein the first communication channel is over a private enterprise network, and the second communication channel is over a public network.

17. The one or more non-transitory computer-readable media of claim 14, wherein the data comprises trading data, and wherein the instructions to shard the data comprise additional instructions that, when executed by the at least one processor, cause the computing platform to:
   identify, from the trading data, non-confidential data and confidential data;
   identify, within the communication network, a third communication channel;
   encrypt the confidential data; and
      wherein the encrypted data comprises an encrypted form of the confidential data,
   and wherein the instructions to send the data comprise additional instructions that, when executed by the at least one processor, cause the computing platform to:
      send the non-confidential data via the third communication channel.

18. The method of claim 8, wherein the first communication channel and the second communication channel are over a cellular network and wherein the computing platform comprises a transceiver, the method further comprising:
   prior to sending the first shard and the second shard, configuring the transceiver to convert the first shard and the second shard into a format compatible with data transmission over the cellular network.

19. The one or more non-transitory computer-readable media of claim 14, wherein the instructions to shard the data comprise additional instructions that, when executed by the at least one processor, cause the computing platform to:
   read a header of a data packet; and
   intercept the data in the data packet only when the header is indicative a data management protocol.

\* \* \* \* \*